Patented Nov. 1, 1949

2,486,445

UNITED STATES PATENT OFFICE 2,486,445

SAFROLE-SULFOXIDE AND SULFONE INSECTICIDE AND PYRETHRIN SYNERGIST

Martin E. Synerholm, Hastings on Hudson, N. Y., assignor to Boyce Thompson Institute for Plant Research, Inc., a corporation of New York No Drawing. Application November 9, 1946, Serial No. 708,921

2 Claims. (Cl. 167—24)

This invention relates to organic compounds and has for its object the provision of new organic compounds which are effective insecticides and synergists. The invention provides insecticidal compositions, and particularly compositions including a new compound of the invention and pyrethrin in a suitable spray base.

The compounds of the invention are sulfoxides and sulfones, both of which may be prepared by the oxidation of certain mercaptan addition products, as with hydrogen peroxide. The sulfoxides are represented by the formula

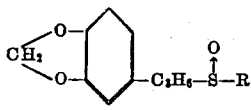

and the sulfones by the formula

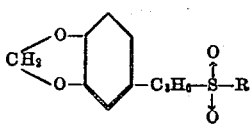

where R is a hydrocarbon radical derived from the mercaptan used in the addition with safrole or isosafrole consisting of aliphatic, aryl aliphatic, phenyl and p-chlorothiophenyl radicals. Particularly advantageous compounds are those where R is an alkyl radical containing from 2 to 12 carbon atoms. The sulfoxides have but one oxygen attached to the sulfur, while the sulfones have two oxygens attached to the sulfur.

Representative compounds of the invention are those in which R is one of the following radicals: ethyl, isopropyl, n-butyl, isobutyl, n-amyl, n-hexyl, n-dodecyl, n-decyl, benzyl, o-chlorobenzyl, 2,4 - dichlorobenzyl, 3,4 - dichlorobenzyl, phenyl, p-chlorophenyl, β-ethoxyethyl, β-butoxyethyl, β-(2-phenoxyethoxy) ethyl, and β-benzoxyethyl.

Examples of the effectiveness of these sulfoxides when tested against houseflies according to the standard Peet-Grady procedure (pp. 92-98 of Pyrethrum Flowers by C. B. Gradinger, 1936 edition) are shown in Table I.

From Table I, it is clear that the compounds described therein have marked insecticidal activity against houseflies. It is apparent, too, that, when used with a small amount of pyrethrins, the combined effect is greater than the effect would be were the activities of the compounds and pyrethrins simply additive; thus synergism is clearly demonstrated.

An aqueous emulsion containing 10% acetone, 0.05% sodium lauryl sulfate, and 0.10% of the sulfoxide of the n-butyl mercaptan isosafrole addition product was used against Aphis rumicis, red spider, gladiolus thrips and Mexican bean beetles in Petri dish experiments. The leaves bearing the insects were sprayed with the emulsion and placed on wet filter paper in the dish. After standing open for one-half hour to allow the acetone to escape, the dishes were covered and left for 24 hours. The results of Table II indicate the kills obtained with the different species of insect. It is clear from these results that the chemical tested is an effective insecticide. While Mexican bean beetles were not killed, the material acted as an effective repellent toward this insect.

In an experiment carried out to test the effect of these compounds on growing plants, sprays containing up to 1.0% of the n-butyl-isosafrole addition product in a water suspension containing 10% acetone with 0.05% sodium lauryl sulfate were applied to the leaves of growing tomato, nasturtium and digitalis plants without noticeable injury even after several weeks' contact.

These compounds are non-toxic to humans, non-injurious to plants in the concentrations used in insecticidal sprays, and are odorless. They are also stable toward atmospheric oxygen and, accordingly, possess distinct advantages over the thioethers from which they are derived. They are more effective than the thioethers as insecticides. The compounds are soluble in the usual organic solvents, such as those of petroleum origin, used for fly sprays.

The mercaptan addition products, formed from aliphatic or aryl aliphatic mercaptans and safrole or isosafrole, result, on oxidation, in sulfoxides. The mercaptan addition products formed from aryl mercaptans, such as phenyl mercaptans or p-chlorophenyl mercaptans and safrole or isosafrole, result, on oxidation, in sulfones. The oxidation is advantageously carried out with an excess of hydrogen peroxide, but may also be effected with nitric acid, permanganate, chromic acid, and electrolytic oxidation methods. In preparing the compounds of the invention, it was found convenient to dissolve the intermediate sulfide in acetic acid and to add an excess of 30% hydrogen peroxide to the acetic acid solution. After several hours the mixture is poured into water whereupon the sulfoxide separates as an oil or as a crystalline mass and is isolated by extraction with a suitable solvent (benzene or ether) which is later removed, or by filtration.

The solids have low melting points in the range 78° to 93°, are pure white, odorless and soluble in kerosene and other related organic solvents used for insect sprays.

TABLE I

Toxicity to houseflies of sulfoxides and sulfones

Type I—Obtained by oxidation of the product of safrole and RSH.

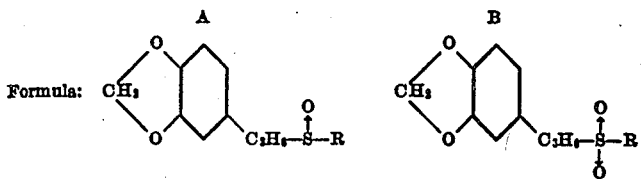

Type II—Obtained by oxidation of the product isosafrole and RSH.

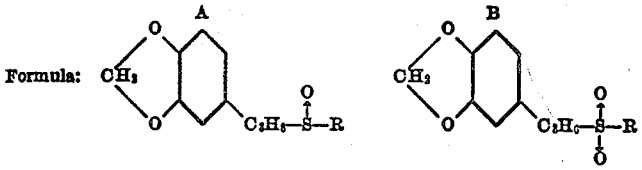

| Type | Compound where R is: | Conc., gm. per 100 ml. | Pyrethrins, gm. per 100 ml. | 10 Min. Knockdown | 24 Hr. Kill | OTI Kill |
|---|---|---|---|---|---|---|
| | | | | Per cent | Per cent | Per cent |
| IIA | —$C_2H_5$, ethyl | 0.2 | 0.0125 | 94 | 37 | 44 |
| IIA | —$C_3H_9$, isopropyl | 0.2 | 0.0125 | 81 | 28 | 44 |
| IA | —$C_4H_7$, n-butyl | 0.5 | | 82 | 50 | 51 |
| | | 0.5 | 0.025 | 98 | 71 | 51 |
| | | 0.25 | 0.025 | 97 | 62 | 52 |
| IIA | —$C_4H_9$, n-butyl | 0.5 | | 85 | 53 | 50 |
| | | 0.5 | 0.025 | 95 | 95 | 51 |
| | | 0.25 | 0.025 | 98 | 82 | 50 |
| | | 0.2 | 0.0125 | 99 | 67 | 47 |
| | | 0.1 | 0.0125 | 97 | 39 | 47 |
| IA | —$C_4H_9$, isobutyl | 0.2 | 0.0125 | 95 | 40 | 50 |
| IIA | —$C_5H_{11}$, n-amyl | 0.5 | | 83 | 45 | 51 |
| | | 0.5 | 0.025 | 98 | 93 | 46 |
| | | 0.25 | 0.025 | 97 | 85 | 51 |
| IA | —$C_6H_{13}$, n-hexyl | 0.5 | | 95 | 49 | 45 |
| | | 0.5 | 0.025 | 100 | 93 | 45 |
| | | 0.25 | 0.025 | 99 | 68 | 45 |
| IA | —$C_{12}H_{25}$, n-dodecyl | 0.2 | 0.0125 | 57 | 17 | 44 |
| IA | —$C_{10}H_{21}$, n-decyl | 0.2 | 0.0125 | 76 | 39 | 44 |
| IA | —$CH_2C_6H_5$, benzyl | 0.2 | 0.0125 | 88 | 34 | 50 |
| IIA | —$CH_2C_6H_5$, benzyl | 0.2 | 0.0125 | 95 | 37 | 50 |
| IA | —$CH_2C_6H_4$-o-Cl, o-chlorobenzyl | 0.2 | 0.0125 | 79 | 20 | 44 |
| IA | —$CH_2C_6H_3$-2,4-$Cl_2$, 2,4-dichlorobenzyl | 0.2 | 0.0125 | 91 | 19 | 44 |
| IA | —$CH_2C_6H_3$-3,4-$Cl_2$, 3,4-dichlorobenzyl | 0.2 | 0.0125 | 62 | 28 | 44 |
| IB | —$C_6H_5$, phenyl | 0.25 | 0.025 | 98 | 70 | 50 |
| | | 0.2 | 0.0125 | 97 | 45 | 50 |
| IIB | —$C_6H_5$, phenyl | 0.25 | 0.025 | 93 | 65 | 50 |
| IIB | —$C_6H_4$-pCl, p-chlorophenyl | 0.25 | 0.025 | 92 | 56 | 50 |
| IIA | —$C_2H_4$—O—$C_2H_5$, β-ethoxyethyl | 0.25 | 0.025 | 93 | 61 | 50 |
| | | 0.2 | 0.0125 | 93 | 40 | 50 |
| IIA | —$C_2H_4$—O—$C_4H_9$, β-butoxyethyl | 0.5 | 0.025 | 85 | 49 | 43 |
| | | 0.25 | 0.025 | 97 | 49 | 50 |
| IA | —$C_2H_4O$—$C_2H_4$—O—$C_6H_5$, β-(2-phenoxyethoxy)ethyl | 0.25 | 0.025 | 94 | 57 | 50 |
| IA | —$C_2H_4$—O—$CH_2C_6H_5$, β-benzoxyethyl | 0.25 | 0.025 | 98 | 66 | 50 |
| | | 0.2 | 0.0125 | 89 | 47 | 44 |

TABLE II

Toxicity toward some agricultural insects of the sulfoxide obtained by oxidation of the n-butyl mercaptan isosafrole addition product (tests run at 0.1%)

| Insect | Host | Per Cent Kill | Per Cent Kill Check | Remarks |
|---|---|---|---|---|
| Aphis rumicis | Nasturtium leaves | 96 / 91 | 3 / 8 | |
| Red spider | Bush bean leaves | 88 / 81 | 6 / 8 | |
| Gladiolus thrips | Gladiolus florets (full) | 100 / 89 | 4 / 4 | Ants which were present in the flowers were also dead. |
| Mexican bean beetle | Bush bean leaves | 0 / 20 | 0 / 0 | No foliage was eaten. |

I claim:

1. An insecticidal composition comprising pyrethrin and a compound of the group consisting of

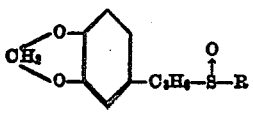

and

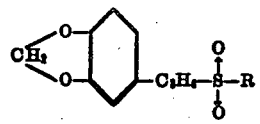

where R is a radical selected from the group consisting of an alkyl radical containing from 2 to 12 carbon atoms, benzyl, o-chlorobenyl, 2,4-dichlorobenzyl, 3,4-dichlorobenzyl, phenyl, p-chlorophenyl, β-ethoxyethyl, β-butoxyethyl, β-(2-phenoxyethoxy)ethyl, and β-benzoxyethyl.

2. An insecticidal composition according to claim 1 in a liquid spray base of petroleum origin.

MARTIN E. SYNERHOLM.

REFERENCES CITED

The following references are of record in the file of this patent:

UNITED STATES PATENTS

| Number | Name | Date |
|---|---|---|
| 2,297,024 | Pohls et al. | Sept. 29, 1942 |
| 2,326,350 | Gertler et al. | Aug. 10, 1943 |
| 2,362,128 | Gertler et al. | Nov. 7, 1944 |
| 2,393,925 | Morris et al. | Jan 29, 1946 |
| 2,411,720 | Gertler et al. | Nov. 26, 1946 |
| 2,421,569 | La Forge | June 3, 1947 |
| 2,421,570 | La Forge | June 3, 1947 |

OTHER REFERENCES

Harvill et al.: Contributions from Boyce Thompson Institute, vol. 13, No. 2, April–June 1943, pages 87–89.